Aug. 28, 1962     L. J. MISURACA     3,051,045
EYEPIECE FOCUSSING MOUNT
Filed July 10, 1959
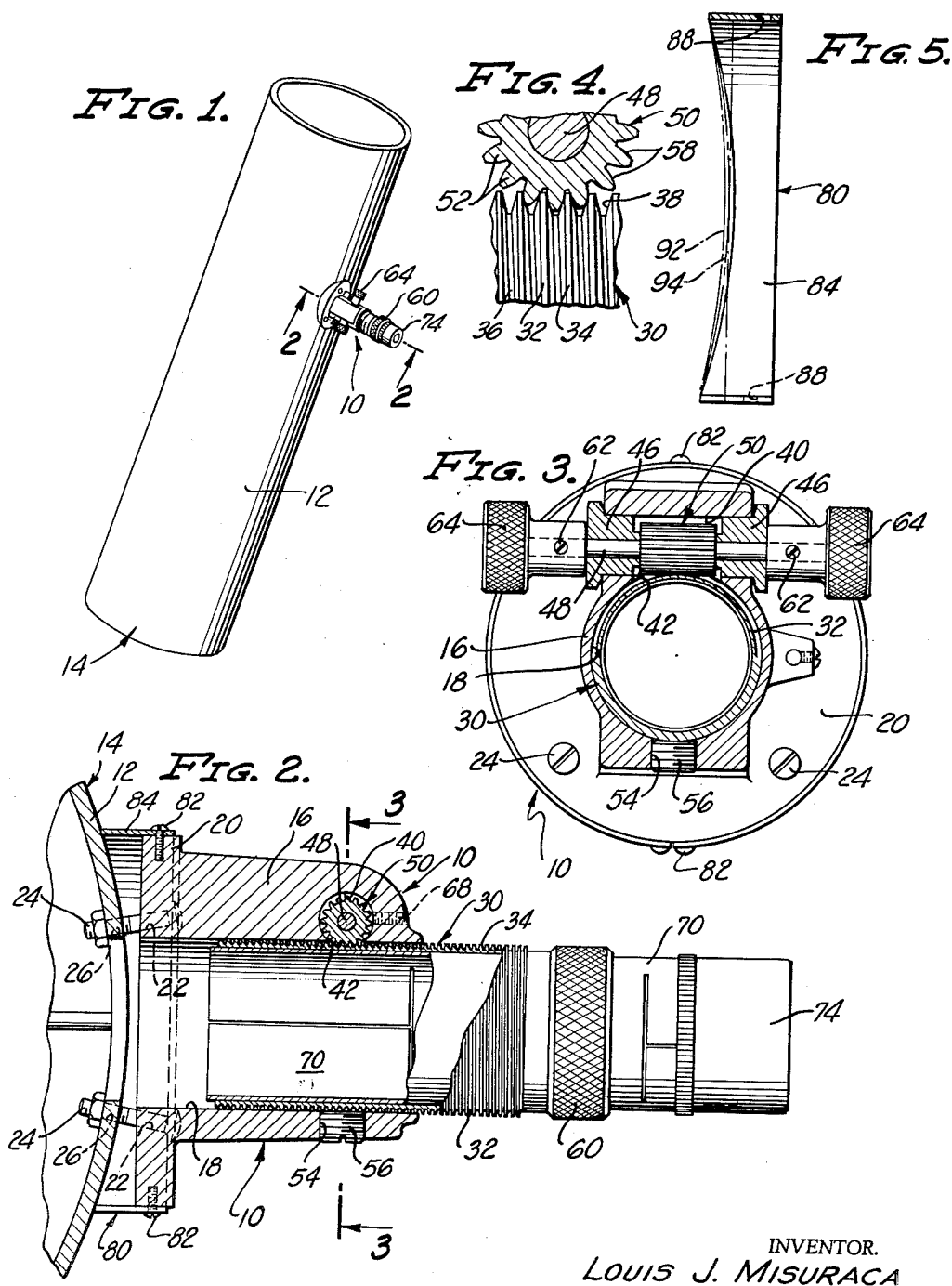
INVENTOR.
LOUIS J. MISURACA
BY Thomas P. Mahoney
ATTORNEY 3,051,045
EYEPIECE FOCUSSING MOUNT
Louis J. Misuraca, 1359 Romulus Drive, Glendale, Calif.
Filed July 10, 1959, Ser. No. 826,214
1 Claim. (Cl. 88—32)

This invention relates to eyepiece mounts adapted to be utilized in conjunction with telescopes of the reflecting and refracting type and, more particularly, to an eyepiece focussing mount which will permit the precise focussing of the eyepiece with respect to the mirror or lenses of the telescope.

One of the prime considerations involved in the manufacture of any optical instrument, such as the eyepiece mount under consideration here, is achieving maximum and optimum resolution of the image being viewed and the optimum resolution can best be obtained by the provision of extremely fine means for adjustment in said instrument.

In prior art devices of the character under consideration here, the adjustment means usually incorporated includes a conventional rack bar which is either fixed to or formed upon the perimeter of the eyepiece carriage or tube of the mount and a pinion which is engageable with said rack bar to cause longitudinal movement of the associated carriage.

If the rack bar is secured to the perimeter of the eyepiece carriage, the expense incident to such securement and misalignment of the rack with respect to the carriage are factors which prevent the achievement of an instrument characterized by optimum and stepless resolution of the image. Of course, if the rack bar is broached or otherwise formed on the outer surface of the carriage there is a tendency for errors to creep into the rack because of the taper problems involved in the formation of the rack bar integral with the carriage.

It is, therefore, an object of my invention to provide an adjustment means for optical and other types of instruments wherein precision adjustment is obtained, which includes a body of cylindrical or circular cross section having a continuous rack (of 360°) cut, milled or otherwise formed on the peripheral surface thereof and engageable by a pinion which causes longitudinal travel of the carriage on which the rack is cut.

Another object of my invention is the provision of an eyepiece focusing mount which includes a housing securable to an associated telescope and having an elongated axial bore therein for the reception of a tubular carriage, the tubular carriage being characterized by the provision thereupon of a continuous, helical rack which surrounds said carriage and which is adapted to be engaged by a pinion so that the carriage may be reciprocated within the bore of the housing.

The continuous helical rack may be milled or cut on the peripheral surface of the carriage and is of straight gear tooth configuration. A preferable method of cutting the helical rack is by the utilization of a single point tool which corresponds, in configuration, to a generated pinion adapted to be utilized in conjunction with the rack in the focussing mount. In this manner, lost motion and limited precision characteristic of prior art constructions are reduced with consequent attainment of optimum resolution of the image being viewed.

While the present invention is disclosed as utilized in conjunction with an eyepiece focussing mount, it will be apparent to those skilled in the art that my rack and pinion construction may be applied to a wide variety of different types of optical instruments and, in addition, be applied with equal effectiveness in various types of devices where the attainment of precise adjustment is indicated.

A further object of my invention is the provision of a rack and pinion construction which includes an elongated cylindrical body having a continuous helical rack formed upon the perimeter thereof, said rack being engageable by a pinion in order that the longitudinal movement of the rack may be accomplished by rotation of the pinion on an axis transverse to the longitudinal axis of the rack, and/or rotational movement of the rack itself.

Another inherent advantage of the focusing mount of my invention is the fact that the coarse adjustment of the carriage may be achieved by rotation of the pinion thereupon while the fine adjustment thereof may be achieved by rotating the carriage with its 360° rack about its axis with respect to the pinion, such rotation being attainable because of the fact that the rack is a continuous helical spiral.

Eyepiece focussing mounts of the character of that under consideration here are usually applied to telescopes having housings of different diameters and it has been customary, in prior art devices, to supply the body of the eyepiece focussing mounts with an unfinished base portion thereupon which must be machined, filed, or otherwise shaped to conform to the external radius of the telescope tube with which the mount is to be utilized.

Another object of my invention is the provision of a focussing mount of the aforementioned character which includes a demountable base element constituted by a properly contoured strip of sheet metal, or the like, which is securable to the base of the housing of the mount and which is contoured to fit the external surface of a telescope housing of a particular size, but which may be later changed to fit other scopes of different sizes. Therefore, if the telescope housing is of 7.5 inch diameter, a base element strip contoured to fit a 7.5 inch housing will be supplied and correspondingly contoured strips may be supplied to fit the external surface of telescope housings of other diameters or even of square section. In this manner, the hand work entailed in shaping the base of the mount is eliminated.

Other objects and advantages of my invention will be apparent from the following specification and the accompanying drawing, which is for the purpose of illustration only and in which:

FIG. 1 is a perspective view showing the eyepiece focussing mount of my invention mounted in operative relationship with a typical reflecting telescope;

FIG. 2 is a longitudinal, sectional view taken on the broken line 2—2 of FIG. 1;

FIG. 3 is a vertical, sectional view taken on the broken line 3—3 of FIG. 2;

FIG. 4 is an enlarged, fragmentary, sectional view illustrating the engagement between the teeth of the pinion and the rack constituting the primary adjustment means of my invenion; and FIG. 5 is a partly sectional view showing some of the various configurations of the base element which may be supplied in conjunction with the housing of the focussing mount of my invention.

Referring to the drawing and particularly to FIGS. 1–2 thereof, I show an eyepiece focussing mount 10 constructed in accordance with the teachings of my invention and adapted to be secured to the cylindrical housing 12 of a reflecting type telescope 14. The focussing mount includes a housing 16 which may be fabricated by die casting, permanent mold or sand casting and which incorporates an elongated axial bore 18 extending from one extremity to the other of said housing.

The housing 16 incorporates an integral circular flange or base 20 having a plurality of openings 22 therein adapted for the reception of bolts 24 engageable in corresponding openings 26 in the telescope housing 12 to mount the housing 16 in operative engagement with the housing 12 of the telescope 14, in a manner to be described in greater detail below.

Mounted for axial movement in the bore 18 is a cylindrical eyepiece carriage 30, said carriage incorporating a 360° continuous, helical gear rack 32 on its outer surface which encompasses the carriage 30 and which thus has its continuous flat face 34 disposed in sliding engagement with the wall of the axial bore 18. It will be noted that, as best shown in FIG. 4 of the drawing, the cross section of the rack 32 is that of a gear tooth wherein not only the face 34 of the tooth but the root 36 and the flank 38 thereof are flat to reduce lost motion and more accurately engage the generated pinion than if the rack were formed with a conventional thread pattern or configuration.

A transverse reamed bore 40 is formed in the housing 16 of the mount 10, said bore forming an elliptical opening 42 in the wall of the bore 18 to establish communication with the axial bore 18 in said housing. The opposite extremities of the bore 40 are adapted for the reception of eccentrically bored bushings 46 which support a shaft 48 having a pinion 50 mounted intermediate its extremities with the teeth 52 thereof projecting through the opening 42 into engagement with the rack 32 on the carriage 30.

A nylon faced "drag" 56, may be provided in the bore 54 and engageable with the rack 32. It will be noted that the faces 58 and the roots of the teeth 52 of the pinion 50 are provided with a slight radius thereupon by generating the entire outward periphery and due to this fact optimum engagement of the teeth 52 of the pinion 50 with the rack 32 is obtained.

Such engagement is graphically illustrated in FIG. 4 of the drawing wherein the fact that at least one tooth 52 of the pinion 50 is always fully seated between the corresponding flanks 38 of adjacent portions of the helical rack 32 is clearly indicated. In addition, it will be noted that the encompassing teeth 52 of the pinion 50 are simultaneously either engaging or disengaging corresponding portions of the helically shaped rack 32. Thus, the rack 32 is always positively located with respect to the pinion 50 with a minimum of backlash and thus accurate adjustment of the carriage 30 bearing the rack 32 in the bore 18 may be attained. After initial adjustment by the rotation of the pinion 50, the carriage 30 itself may be rotated about its axis by turning a knurled portion 60 on the upper extremity thereof. In this manner extremely fine adjustment of the carriage 30 in the bore 18 may be achieved, as a full turn of rack equals but one pitch of said rack.

Mounted upon the outer extremities of the shaft 48 by means of set screws 62 are adjusting knobs 64 adapted to be rotated to cause corresponding rotation of the shaft 48 and the pinion 50. It will be noted that set screws 68 also engage the perimeters of the eccentric bushings 46 which maintain said bearings in predetermined positions of adjustment within the bore 40. It is obvious that, by rotation of the bearings 46 concomitantly with each other, the shaft 48 and thus the pinion 50 can be moved toward or away from the rack 32 on the perimeter of the carriage 30, and also a slight "drag" on shaft 48 may be established.

Mounted within the carriage 30 is an eyepiece receiving sleeve 70 which is split, top and bottom and is slidable with respect to the carriage 30. The sleeve 70 slidably mounts the eyepiece 74 and can be slid back and forth in the carriage 30 to permit further adjustment of the eyepiece 74 or removal of said eyepiece from said carriage.

Secured to the circular perimeter of the base flange 20 on the mount housnig 16 is a base element 80, screws or similar fasteners 82 being engaged in said base element to secure it firmly to said flange. The flange 20 may be modified when adapted to a refractor telescope. The base element 80 is constituted by an elongated strip 84 of sheet metal which incorporates a properly developed form to conform with the radius of the external surface of the telescope housing 12. The strip is provided with openings 88 intermediate and at its extremities for the reception of the mounting screws 82 which secure the strip 84 in operative engagement with the flange 20. Strips 84 having concavities 92 and 94 of different radii (or even straight), as best shown in FIG. 5, may be provided to conform to telescope housings of corresponding radii, or flat sides.

By the provision of the demountable base strips 84, the customary hand work entailed in shaping the bases of prior art focussing mounts to the configuration of the external surfaces of the telescopes with which they are to be utilized is eliminated, with the attainment of both greater mounting accuracy and the consequent saving in time and labor. Also, very often the user will want a telescope of other size at some future time and the whole amount need not be discarded or re-worked. Just the base strip need be changed.

I thus provide by my invention an eyepiece focussing mount which is characterized by both its simplicity of construction and the exceptional precision with which it may be adjusted to achieve optimum resolution of an image viewed therethrough. The precision of adjustment is achieved by the incorporation of adjustment means including a continuous helical rack formed on the perimeter of the carriage incorporated in the mount. For example, with a pitch of .050 inch on the rack, ten degrees of rotation equals but .001389 inch of eyepiece shift.

Also characteristic of the mount of my invention is the ease with which it may be installed in operative relationship with an associated telescope because of the provision of demountable base elements adapted to be secured to the mount and conforming in radius to the external radius of the housing of the associated telescope.

I claim:

In an eyepiece mount for use in conjunction with a telescope, the combination of: a housing having an elongated axial bore therein and also incorporating a transversely oriented bore in communication with said axial bore, said housing having a flat mounting flange at one extremity with a circular perimeter; an eyepiece carriage of cylindrical configuration mounted for axial movement in said bore and having a continuous helical rack formed upon its external surface and in encompassing relationship therewith; a pinion mounted in said housing in said transversely oriented bore for engagement with said rack whereby rotation of said pinion in said transverse bore will result in longitudinal transposition of said carriage in said axial bore and whereby such transposition may concurrently or separately be attained by rotation of the rack itself; and a sheet metal mounting strip bent into conformity with the circular perimeter of said flange and secured thereto, said strip having arcuate recesses in one edge thereof conforming to the external configuration of a telescope upon which said housing is mounted.

References Cited in the file of this patent

UNITED STATES PATENTS

| | | |
|---|---|---|
| 918,752 | Konig | Apr. 20, 1909 |
| 980,896 | Gowlland | Jan. 3, 1911 |
| 1,899,192 | Gaertner | Feb. 28, 1933 |
| 2,003,171 | Burrell | May 28, 1935 |

FOREIGN PATENTS

| | | |
|---|---|---|
| 19,018 | Great Britain | of 1903 |
| 703,077 | France | Feb. 2, 1931 |